US012692794B2

(12) United States Patent
Schlemmer et al.

(10) Patent No.: US 12,692,794 B2
(45) Date of Patent: Jul. 28, 2026

(54) GUIDE VANE, GUIDE VANE CLUSTER, AND HOUSING FOR A GAS TURBINE AS WELL AS GAS TURBINE HAVING A PLATFORM WITH AN ARCHED WALL SECTION TO RECEIVE A DAMPER

(71) Applicant: MTU Aero Engines AG, Munich (DE)

(72) Inventors: Markus Schlemmer, Mainburg / Sandelzhausen (DE); Werner Humhauser, Moosburg (DE); Andreas Hartung, Munich (DE); Adam Koscso, Munich (DE); Dennis Von Brauneck, Munich (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/915,017

(22) Filed: Oct. 14, 2024

(65) Prior Publication Data

US 2025/0122807 A1 Apr. 17, 2025

(30) Foreign Application Priority Data

Oct. 17, 2023 (DE) ..................... 10 2023 128 456.8

(51) Int. Cl.
*F01D 9/04* (2006.01)
*F01D 25/04* (2006.01)
*F01D 25/24* (2006.01)

(52) U.S. Cl.
CPC ............. *F01D 9/041* (2013.01); *F01D 25/04* (2013.01); *F01D 25/24* (2013.01); *F05D 2220/323* (2013.01); *F05D 2240/125* (2013.01); *F05D 2240/80* (2013.01)

(58) Field of Classification Search
CPC .................................... F01D 9/041; F01D 9/04
See application file for complete search history.

(56) References Cited

U.S. PATENT DOCUMENTS 3,326,523 A 6/1967 Bobo
4,431,373 A * 2/1984 Monsarrat ............. F01D 25/246 415/199.5
4,784,569 A * 11/1988 Sidenstick .............. F01D 11/18 415/173.1

(Continued)

FOREIGN PATENT DOCUMENTS

DE 3917937 A1 12/1989
DE 3917937 C2 12/1998

(Continued)

*Primary Examiner* — Michael L Sehn
(74) *Attorney, Agent, or Firm* — Hinckley, Allen & Snyder, LLP; David R. Josephs

(57) ABSTRACT

The invention relates to a guide vane for a gas turbine, comprising an airfoil, a platform arranged at a radial end of the airfoil, an upstream flange extending radially from the platform, and a downstream flange extending radially from the platform, wherein the flanges, together with a section of the platform lying between the flanges, bound a groove extending in the circumferential direction of the gas turbine for the arrangement of a damping element. A surface of the section of the platform bounding the groove is arched radially at least in regions thereof in the direction of an opening of the groove. The invention further relates to a guide vane cluster, a housing for a gas turbine, as well as to a gas turbine.

12 Claims, 2 Drawing Sheets

(56) References Cited

U.S. PATENT DOCUMENTS

Figure 1:
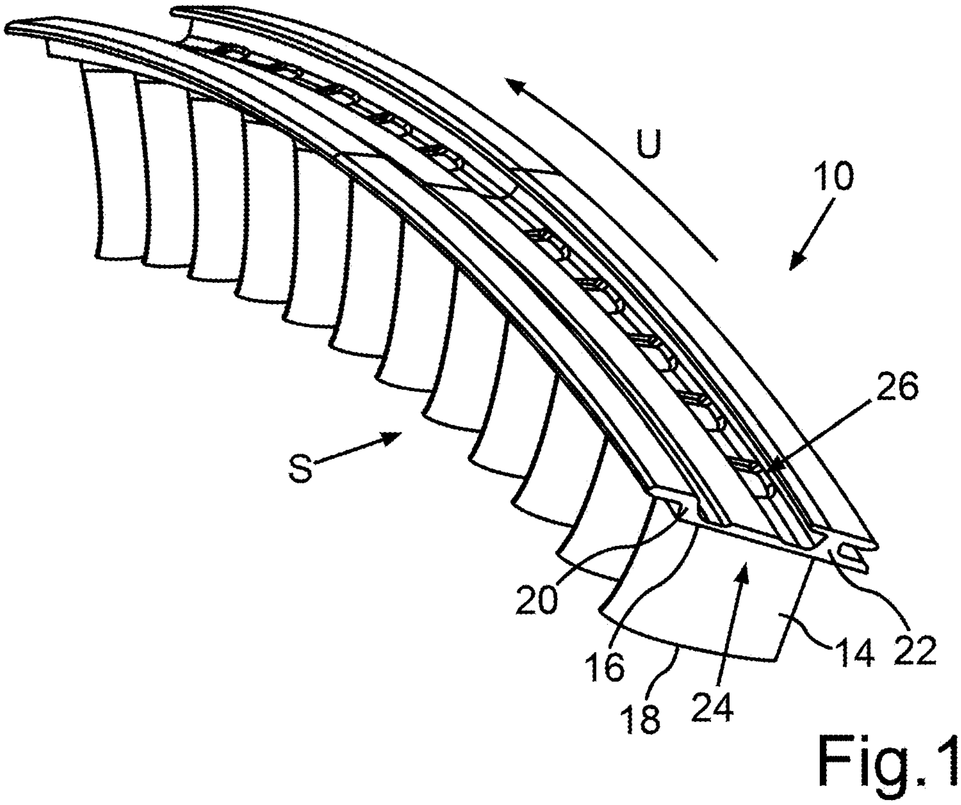

| | | | |
|---|---|---|---|
| 5,494,404 | A | 2/1996 | Furseth et al. |
| 8,920,112 | B2 * | 12/2014 | Ring .................... F01D 25/246 415/209.3 |
| 9,845,702 | B2 * | 12/2017 | Leslie .................. F04D 29/522 |
| 9,863,271 | B2 * | 1/2018 | Granberg ............ B23K 26/389 |
| 10,450,878 | B2 | 10/2019 | Baumann |
| 10,934,874 | B2 | 3/2021 | Sanzari et al. |
| 11,047,250 | B2 * | 6/2021 | Barker .................. F01D 11/08 |
| 2008/0019836 | A1 | 1/2008 | Butz et al. |
| 2014/0369844 | A1 | 12/2014 | Hansom et al. |
| 2016/0312800 | A1 | 10/2016 | Leslie et al. |
| 2019/0055850 | A1 | 2/2019 | Edwards et al. |
| 2019/0128137 | A1 | 5/2019 | Wesling et al. |

FOREIGN PATENT DOCUMENTS

| | | | |
|---|---|---|---|
| DE | 3926706 | C2 | 4/1999 |
| EP | 0522833 | A1 | 1/1993 |
| EP | 1441108 | B1 | 3/2011 |
| EP | 2613021 | A2 | 7/2013 |
| EP | 3749838 | B1 | 4/2022 |
| FR | 3039201 | A1 | 1/2017 |
| WO | 2022168951 | A1 | 8/2022 |

* cited by examiner

GUIDE VANE, GUIDE VANE CLUSTER, AND HOUSING FOR A GAS TURBINE AS WELL AS GAS TURBINE HAVING A PLATFORM WITH AN ARCHED WALL SECTION TO RECEIVE A DAMPER

BACKGROUND OF THE INVENTION

The invention relates to a guide vane and a guide vane cluster as well as a housing for a gas turbine, in particular for an aircraft engine. The invention further relates to a gas turbine with correspondingly designed guide vanes and guide vane clusters, and/or a correspondingly designed housing.

Guide vanes and guide vane clusters for gas turbines are already known from the prior art and serve as stator assemblies in the flow channel of a housing of the gas turbine to control the flow of the working medium in the gas turbine and to ensure a desired incident flow to the downstream-lying rotating blades of a rotor. This makes possible an efficient energy transformation and generation of power. Guide vane clusters comprise two or more guide vanes, which are connected to one another by way of at least one common platform for the radial delimitation of the flow channel. In this way, each vane has an airfoil with a suction side and a pressure side, which are connected to each other in an upstream leading edge, subjected to the incident flow of the working fluid of the turbomachine during operation, and an axially opposite-lying trailing edge, which is to be arranged downstream. A plurality of guide vanes or guide vane clusters are arranged in the form of a guide vane ring or guide vane cascade in a compressor and/or a turbine of the turbomachine in a stationary manner with respect to a housing of the turbomachine.

It is known from DE 39 17 937 A1 to furnish the platform of guide vanes or guide vane clusters with an upstream flange extending radially from the platform and a downstream flange extending radially from the platform, whereby the flanges, together with a section of the platform lying between the flanges bound a groove extending in the peripheral or circumferential direction of the gas turbine for the arrangement of a damping element. Linkage of the platform to the housing or to a seal can be produced by way of the flanges. On account of its frictional contact, the damping element arranged in the groove ensures a vibrational damping of the guide vanes. The vibrations arise essentially by way of vortex entrainment and pressure fluctuations of the working medium flowing along the guide vanes, which lead to bending and torsional loads on the guide vanes. Therefore, a damping of the guide vanes is important in order to reduce the vibrational amplitudes, because, otherwise, vibrational fatigue and an increased probability of fracture may occur.

It has been found, however, that existing vibrational damping solutions are not always adequate. In particular, in high cycle fatigue (HCF), vibrational cracking may occur owing to the dynamic load after a number of load changes and, initially, can occur macroscopically without any directly detectable plastic deformation. This relates not solely, but particularly to so-called cantilevered guide vanes or guide vane clusters with exposed vane tips.

SUMMARY OF THE INVENTION

The object of the present invention is to create a guide vane for a gas turbine that makes possible an improved vibrational damping. Further objects of the invention consist in creating a corresponding guide vane cluster having the possibility of an improved vibrational damping and a housing for a gas turbine with correspondingly improved guide vanes and guide vane clusters as well as a correspondingly improved gas turbine.

The objects are achieved in accordance with the invention by a guide vane, by a guide vane cluster, by a housing as well as by a gas turbine of the present invention. Advantageous embodiments with targeted further developments of the invention are specified below, whereby advantageous embodiments of each aspect of the invention are to be regarded as advantageous embodiments of the respective other aspects of the invention and vice versa.

A first aspect of the invention relates to a guide vane for a gas turbine, comprising an airfoil, a platform arranged at a radial end of the airfoil, an upstream flange extending radially from the platform, and a downstream flange extending radially from the platform, wherein the flanges, together with a section of the platform lying between the flanges, bound a groove extending in the circumferential direction of the gas turbine for the arrangement of a damping element. An improved vibrational damping is made possible in accordance with the invention in that a surface of the section of the platform bounding the groove is arched radially at least in regions thereof in the direction of an opening of the groove. In other words, the surface of the platform forming the “floor” or a wall region of the groove is not, as hitherto, planar or formed with circular cylindrical segments in the circumferential direction, but rather, in cross section in the axial direction, has a convex arch, which may also be referred to as a relative thickening or rib. Such an “uneven” form of the “floor” of the groove makes possible an improved frictional contact and thus an improved force transmission for a damping element arranged in the groove, thereby being able to create accordingly a more uniform and operationally secure contact to the guide vane and hence being able to realize an improved vibrational damping. The geometry of the damping element can hereby be chosen nearly at will as long as it allows a contact to be formed at least with the arched surface of the groove. In the scope of the present invention, the specified directions “radially” or “radial,” “axially” or “axial,” and “circumferential” always relate to the machine axis of a gas turbine when the guide vane according to the invention or the guide vane cluster according to the invention is mounted in it in an appropriate manner, unless something else ensues explicitly or implicitly from the context. Besides the vibrational damping as a result of energy dissipation under friction, the damping element, which, fundamentally, can also be referred to as a friction contact, has a further capability in order to reduce the vibrational load. This reduction occurs through absorption or redistribution of the energy resulting from a vibrational mode that is to be damped into another, higher and/or lower vibrational mode. The damping element can therefore be designed and used in general either for energy dissipation or for absorption (energy transfer/conversion) or can be designed and used for a combination of the two vibrational modes.

In an advantageous embodiment of the invention, it is provided that a surface of the section of the platform facing away from the groove is arched radially at least in regions thereof in the direction of the opening of the groove and/or that, in cross section, the section of the platform has an at least essentially uniform wall thickness. In other words, in accordance with the invention, it is provided that the surface of the platform facing the working medium of the gas turbine, as viewed in the axial direction from an upstream side to a downstream side, is uneven and preferably concave; that is, it is deformed toward the opening of the groove likewise in the radial direction. Besides aerodynamic advantages due to such an arched surface of the platform in the region of the passing flow of working fluid, it is hereby possible nonetheless to retain an at least essentially uniform wall thickness of the platform, so that, owing to the described relative deformation or contouring of the platform, no additional vibrational or strength problems ensue.

Further advantages ensue in that the airfoil has an exposed vane tip with respect to the platform. In other words, the guide vane is designed with a so-called cantilevered construction, that is, with a free vane end at the hub and a corresponding radial gap. On account of the connection of adjacent airfoils, stators with a shroud afford, as a rule, a mechanically more stable system with comparably less vibrational tendency of the guide vanes at the cost of a markedly more complex geometry and accordingly higher fabrication costs. In contrast to this, cantilevered guide vanes without an additional platform or shroud are comparably more prone to vibrations, but are markedly less expensive to fabricate. On account of the improved vibrational properties in accordance with the invention, it is possible to overcome these potential drawbacks of the cantilevered construction.

In a further preferred embodiment of the invention, it is provided that the upstream flange has a downstream overhang in the groove and/or that the downstream flange comprises an upstream overhang in the groove. In this way, it is possible to realize a one-side or two-side hooklike barrier, which, in an especially reliable manner, prevents a damping element arranged in the groove from falling out and, beyond this, can form additional contact sites for the damping element. Alternatively or additionally, it is provided that the upstream flange has an upstream overhang that, together with the platform, forms a further groove extending in the circumferential direction of the gas turbine and/or that the downstream flange has a downstream overhang that, together with the platform, forms a further groove extending in the circumferential direction of the gas turbine. In this way, it is possible, by way of retaining hooks that engage in the groove or grooves, to fasten the platform to the housing, to a sealing element, or the like in an especially simple and reliable manner. A further advantage of the mentioned overhangs, individually and in any combination, consists in the fact that, in addition to a damping element arranged in the groove of the platform, they form an inherent further damping element for additional vibrational damping.

A second aspect of the invention relates to a guide vane cluster for a gas turbine, in which at least two guide vanes in accordance with the first aspect of the invention are connected to one another by way of at least one common platform for radial bounding of a flow channel of the gas turbine. In this way, it is possible to realize the advantages described in connection with the first aspect of the invention and, in particular, to realize the improved frictional contact and the thereby improved vibrational damping for a damping element arranged in the groove of the platform of the guide vane cluster even for a guide vane cluster with two, three, four, or more airfoils.

A third aspect of the invention relates to a housing for a gas turbine, with a flow channel in which a plurality of guide vanes in accordance with the first aspect of the invention and/or a plurality of guide vane clusters in accordance with the second aspect of the invention are arranged in a cascade-like manner, wherein the grooves of the guide vanes and/or guide vane clusters extending in the circumferential direction of the gas turbine align with one another and wherein at least one damping element is arranged in at least one of the grooves. In this way, it is possible for the reasons described above to realize an improved vibrational damping. In general, the damping element can be designed in a one-part or multi-part manner and extends preferably along the entire circumference of the guide vane cascade formed from the guide vanes or guide vane clusters for an optimal vibrational damping.

In an advantageous embodiment of the invention, it is provided that the at least one damping element has a recess in the region of the section of the associated platform arched radially in the direction of an opening of the groove. In this way, it is possible, in addition to a reduction in weight, to achieve, in particular, a deliberate "detuning" of the damping element, as a result of which a simple adaptability to the natural frequencies and the vibrational response of the respective guide vanes can be achieved. Alternatively or additionally, it is provided that, in cross section, the damping element is designed to be u-shaped or o-shaped or clamp-shaped. Alternatively or additionally, it is provided that the damping element is formed so as to be linear in the circumferential direction. This is appropriate, in particular, for comparably short damping elements, for which a curvature of the guide vane or of the guide vane cluster can be neglected, because, in this way, the damping element can be manufactured in an especially cost-effective manner without complex curvatures.

In a further embodiment, an especially reliable vibrational damping ensues in that, in cross section, the damping element has at least three contact points in the groove and/or in that the damping element has at least one contact point and preferably at least two contact points with the housing. Instead of a contact point, it is also possible, in general, to provide a flat contact.

In a further preferred embodiment of the invention, it is provided that the damping element is arranged in a bridging manner between at least two mutually adjacent guide vanes and/or guide vane clusters. In this way, the damping element can act advantageously also as a sealing element, as a result of which additional standard sealing plates and the like can be dispensed with between the adjacent guide vanes or guide vane clusters.

A fourth aspect of the invention relates to a gas turbine, in particular an aircraft engine, with at least one guide vane in accordance with the first aspect of the invention and/or at least one guide vane cluster in accordance with the second aspect of the invention and/or at least one housing in accordance with the third aspect of the invention. The features and the advantages thereof that thereby ensue are to be taken from the above description of the first three aspects of the invention.

BRIEF DESCRIPTION OF THE DRAWING FIGURES

Figure 2:
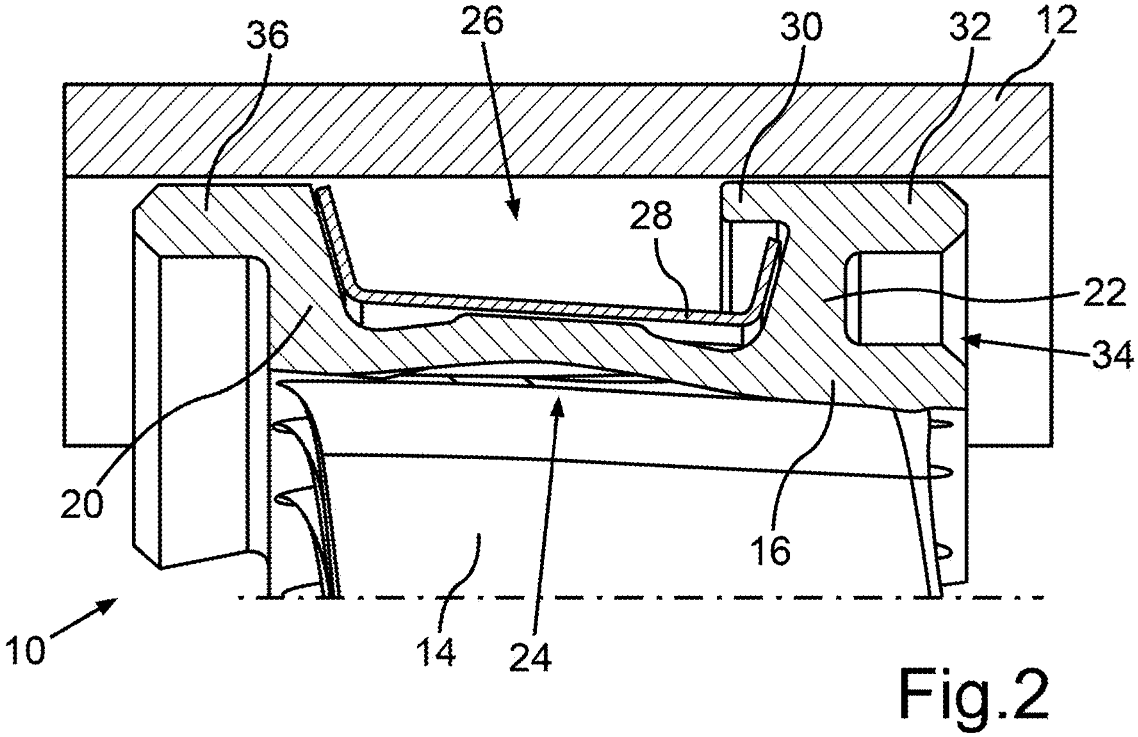
Figure 3:
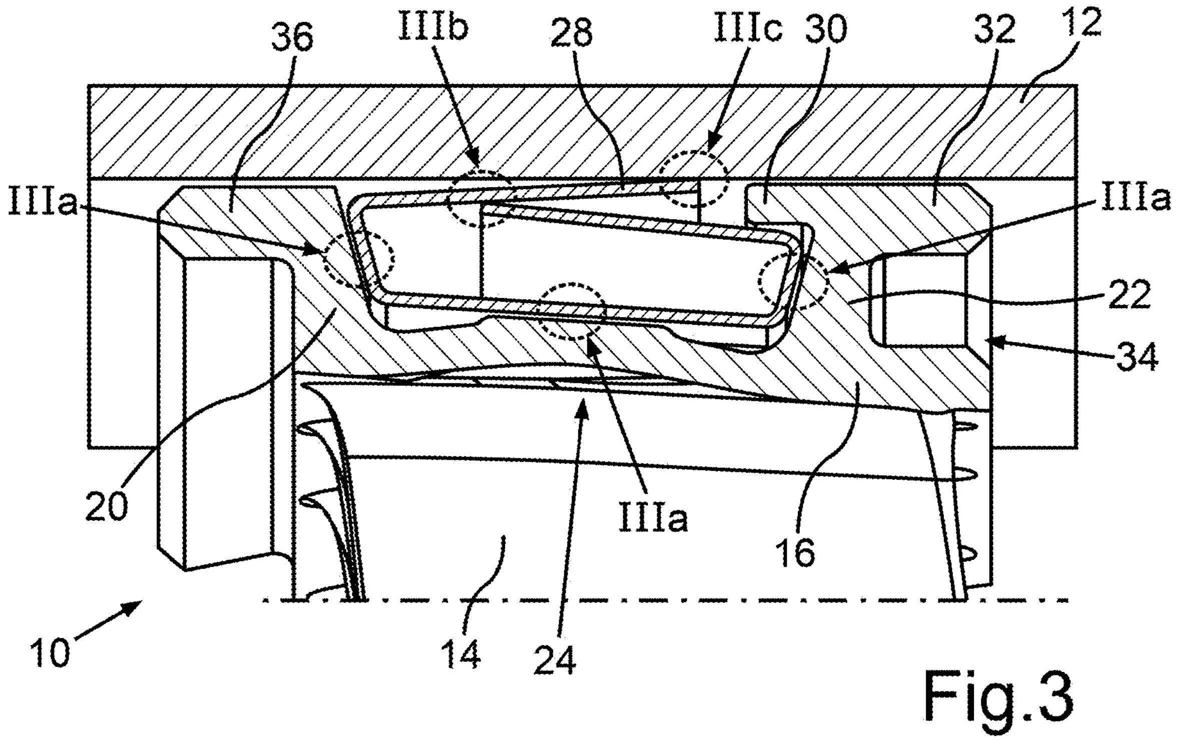
Figure 4:
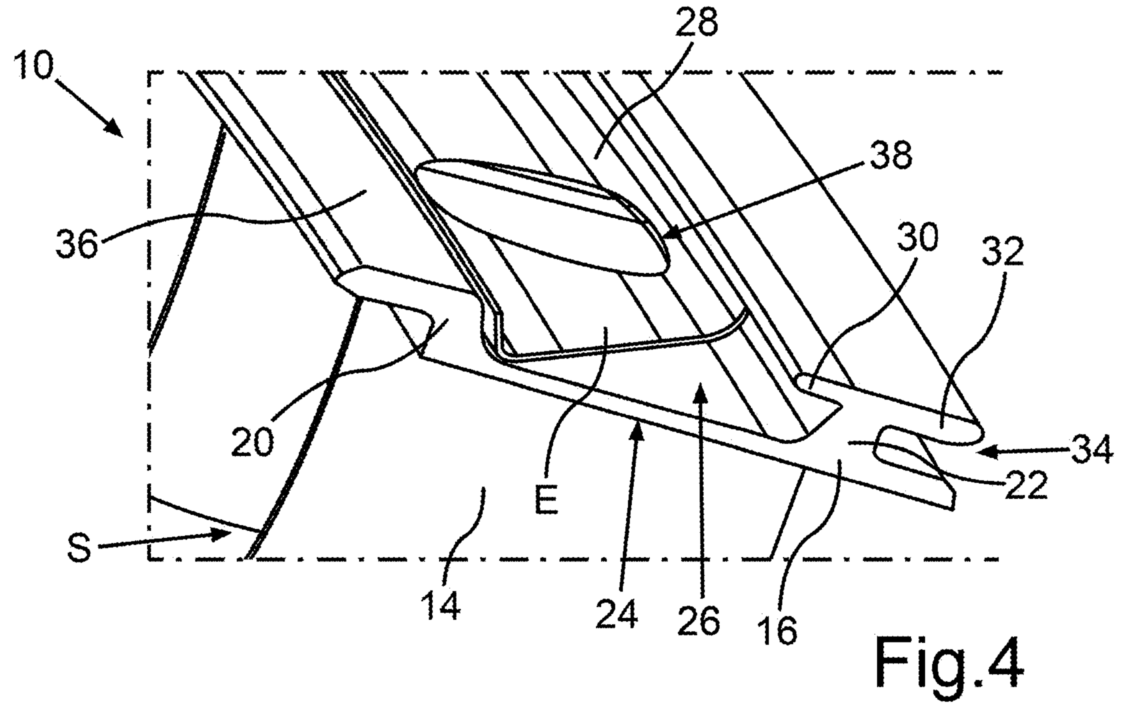

Further features of the invention ensue from the claims and the exemplary embodiments. The features and combinations of features mentioned in the above description as well as the combinations of features mentioned in the following examples can be used not only in the respectively specified combinations but also in other combinations or alone, without leaving the scope of the invention. Therefore, embodiments of the invention that are not explicitly shown and explained in the examples are also be regarded as included and disclosed. Embodiments and combinations of features that do not have all features of an independent claim as originally formulated are also to be regarded as disclosed. Shown are:

FIG. 1 a perspective view of two guide vane clusters according to the invention;

FIG. 2 a schematic sectional view through a platform of a guide vane cluster arranged on a housing of a gas turbine;

FIG. 3 a schematic and sectional perspective view of the guide vane cluster arranged on the housing, with an alternative damping element being arranged in a groove; and FIG. 4 a schematic and sectional perspective plane view of a platform of a guide vane cluster, with a further alternative damping element being arranged in the groove.

DESCRIPTION OF THE INVENTION

FIG. 1 shows a perspective view of two guide vane clusters 10 according to the invention, which are arranged in a way that is known as such with further guide vane clusters 10 in a cascading manner as a stator group in a housing 12 (see FIG. 2) of a gas turbine (not shown), in particular a gas turbine of an aircraft engine. Each guide vane cluster 10 has a plurality of airfoils 14, which are connected to one another by way of a common, radial outer platform 16. The platform 16 forms a shroud for the bounding of a flow channel S of the associated gas turbine. In the exemplary embodiment shown, the guide vane cluster 10 is designed as a so-called cantilevered construction, so that the vane tips 18 of the airfoils 14 are exposed. FIG. 1 will be explained below in conjunction with FIG. 2, which shows a schematic sectional view through the platform 16 of a guide vane cluster 10 arranged on the housing 12 of the gas turbine. It can be seen that the platform 16 has an upstream flange 20 extending radially from the platform 16 and a downstream flange 22 extending radially from the platform 16. The flanges 20, 22, together with a section 24 of the platform lying between the flanges 20, 22, form a groove 26 extending in the circumferential direction U of the gas turbine or of the housing. As shown in FIG. 2, a clamp-shaped damping element 28 is arranged in the groove 26 for vibrational damping. As can be seen in FIG. 2, in particular, a surface of the section 24 of the platform 16 bounding the groove 26, is arched radially at least in regions thereof in the direction of a radial upper opening of the groove 26. In other words, the surface of the platform 16 forming the "floor" or a wall region of the groove 26 is not planar or formed from circular cylindrical segments in the circumferential direction, but rather, in cross section, has a convex arch in the axial direction, which may also be referred to as a relative thickening, a rib, or a contact rib. Such an "uneven" form of the "floor" of the groove 26 makes possible an improved frictional contact and accordingly an improved force transmission for the damping element 28 arranged in the groove 26, which, in accordance therewith, can form a more uniform and operationally secure contact to a guide vane or a guide vane cluster 10 and hence realize an improved vibrational damping. In FIG. 1, the rib-shaped "thickening" or deformation of the platform 16 can be seen and, in the case of a fully mounted guide vane cascade, is formed around the circumferential side. As can be seen in FIG. 2, it is possible in many embodiments for a surface of the section 24 of the platform 16 facing away from the groove 26 also to be arched radially at least in regions thereof in the direction of the opening of the groove 26, as a result of which, in cross section, the section 24 of the platform 16 has an at least essentially uniform or constant wall thickness. Beyond this, the platform 16 accordingly has an aerodynamically favorable wall contour for the passing flow of working medium during operation of the gas turbine. Preferably, the guide vane or the guide vane cluster 10 is additively manufactured in order that the mentioned geometric features can be realized simply and reliably. The present u-shaped damping element 28 has at least three contact points or areas and lies upstream against the flange 20, in its middle region against the rib-shaped section 24, and downstream against the flange 22. As can be seen further in FIG. 2, the downstream flange 22 has a wall inclined downstream, against which a downstream arm of the damping element 28 rests, as well as, at its radial outer end region, an upstream overhang 30, which projects into the groove 26 and bounds the opening of the groove 26, as a result of which a kind of pocket or securing against falling out as well as, if need be, an additional contact point for the damping element 28 are realized. Furthermore, the downstream flange 22 has a downstream overhang 32, which, together with the platform 16, forms a further groove 34, which extends likewise around the circumferential side and is suitable for mounting fastening hooks or the like for fixing the guide vane cluster 10 to the housing 12, to a sealing element, or to other structural elements. Accordingly, in cross section, the flange 22 has an approximatively T-shaped form. Regardless of the flange 22, it is fundamentally possible for the flange 20 to have a T-shaped form as well.

The upstream flange 20, on its part, has a wall that is inclined upstream, against which an upstream arm of the damping element 28 rests. Furthermore, the flange 20 comprises an upstream overhang 36, which likewise serves for the fastening of the guide vane cluster 10. On their part, the overhangs 30, 32, 36 function, in addition, as additional damping elements.

FIG. 3 shows a schematic and sectional perspective view of the guide vane cluster 10 arranged on the housing 12, with an alternative damping element 28 being arranged in the groove 26. The general construction of the guide vane cluster 10 corresponds to the above exemplary embodiment. In contrast to the above u-shaped damping element 28 in FIG. 2, the damping element 28 in the present case is clamp-shaped in form or is bent back upon itself in some regions. In this way, the damping element 28 has, in addition to the previously mentioned three contact points or areas IIIa in the groove, a contact site IIIb with itself as well as, optionally, a contact site IIIc with the housing 12. The vibrational damping can therefore be realized not only by friction with the guide vane cluster 10, but also by friction in itself as well as, if need be, by friction with the housing 12.

FIG. 4 shows a schematic and sectional perspective plane view of a platform 16 of a guide vane cluster 10, with a further alternative damping element 28 being arranged in the groove 26. In contrast to the previous exemplary embodiments, the platform 16 in the section 24 is not deformed on its side facing the flow channel S, but rather has a flat contour. Furthermore, the damping element 28 has a recess 38 in the contact region with the section 24 of the platform 16 for adaptation of its damping properties. Furthermore, it can be seen that an end region E of the damping element 28 extends obliquely with respect to the edge of the platform 16 and does not end flush with the platform 16. In this way, it is possible to arrange the damping elements 28 of adjacent guide vane clusters 10 in an overlapping or segment-overlapping manner, as a result of which it is possible advantageously to dispense with additional sealing plates or the like. In the case of short guide vane clusters 10 or individual vanes, it is possible to design the damping element 28 as a straight element, thereby simplifying its fabrication.

What is claimed is:

1. A guide vane for a gas turbine, comprising an airfoil having a radial outer end and a radial inner end:

a platform connected to the radial outer end of the airfoil and the radial inner end of the airfoil being exposed, an upstream flange extending radially from the platform, and a downstream flange extending radially from the platform, wherein the flanges, together with a section of the platform lying between the flanges, bound a groove extending in the circumferential direction of the gas turbine for the arrangement of a damper, wherein a wall section of the platform, between the upstream flange and the downstream flange and bounding the groove, has a radially arched shape at least in regions thereof in the direction of an opening of the groove; the wall section of the platform having a middle section, an axial upstream section and an axially downstream section; the middle section being more radially outward than the axial upstream section and the axial downstream section; a surface of the platform facing away from the groove being arched radially at least in regions thereof in the direction of the groove.

2. The guide vane according to claim 1, wherein, in cross section, the wall section of the platform has a uniform wall thickness.

3. The guide vane according to claim 1, wherein the airfoil has an exposed vane tip with respect to the platform.

4. The guide vane according to claim 1, wherein the upstream flange has a downstream overhang in the groove, and/or in that the downstream flange comprises an upstream overhang in the groove, and/or in that the upstream flange has an upstream overhang, which, together with the platform, forms a further groove extending in the circumferential direction of the gas turbine, and/or the downstream flange has a downstream overhang, which, together with the platform, forms a further groove extending in the circumferential direction of the gas turbine.

5. A guide vane cluster for the gas turbine, in which at least two guide vanes according to claim 1, are connected to one another by way of at least one common platform for the radial bounding of a flow channel of the gas turbine.

6. An aircraft engine with at least one guide vane cluster according to claim 5.

7. An aircraft engine with at least one guide vane according to claim 1.

8. A housing for a gas turbine, with a flow channel, comprising:

a plurality of guide vanes each including:

a radial outer end and a radial inner end, a platform connected to the radial outer end of the airfoil and the radial inner end of the airfoil being exposed, an upstream flange extending radially from the platform, and a downstream flange extending radially from the platform, wherein the flanges, together with a section of the platform lying between the flange, bound a groove extending in the circumferential direction of the gas turbine for the arrangement of a damper, wherein a wall section of the platform, between the upstream flange and the downstream flange and bounding the groove, has a radially arched shape at least in regions thereof in the direction of an opening of the groove; the wall section of the platform having a middle section, an axial upstream section and an axially downstream section; the middle section being more radially outward than the axial upstream section and the axial downstream section; a surface of the platform facing away from the groove being arched radially at least in regions thereof in the direction of the groove;

and/or a plurality of guide vane clusters each including:

at least two of the guide vanes connected to one another by way of at least one common platform for the radial bounding of a flow channel of the gas turbine;

are arranged in a cascade manner, wherein the grooves of the guide vanes and/or the guide vane clusters extending in the circumferential direction of the gas turbine are aligned flush with one another, and wherein at least one damper is arranged in at least one of the grooves.

9. The housing according to claim 8, wherein the at least one damper has a recess in the region of the section of the associated platform arched radially in the direction of an opening of the groove, and/or, in cross section, the damper is U-shaped or O-shaped or clamp-shaped in design, and/or the damper is configured and arranged to be linear in the circumferential direction.

10. The housing according to claim 8, wherein, in cross section, the damper has at least three contact points in the groove, and/or the damper has at least two contact points with the housing.

11. The housing according to claim 8, wherein the damper is arranged in a bridging manner between at least two mutually adjacent guide vanes and/or guide vane clusters.

12. An aircraft engine with at least the housing according to claim 8.

* * * * *